June 30, 1925.  1,544,083

F. S. WHITTEN

METHOD AND MEANS FOR SURFACING OR EDGING ARTICLES

Filed Oct. 12, 1921  6 Sheets-Sheet 1

INVENTOR
Francis S. Whitten
BY
Ray B. Whitman
ATTORNEY

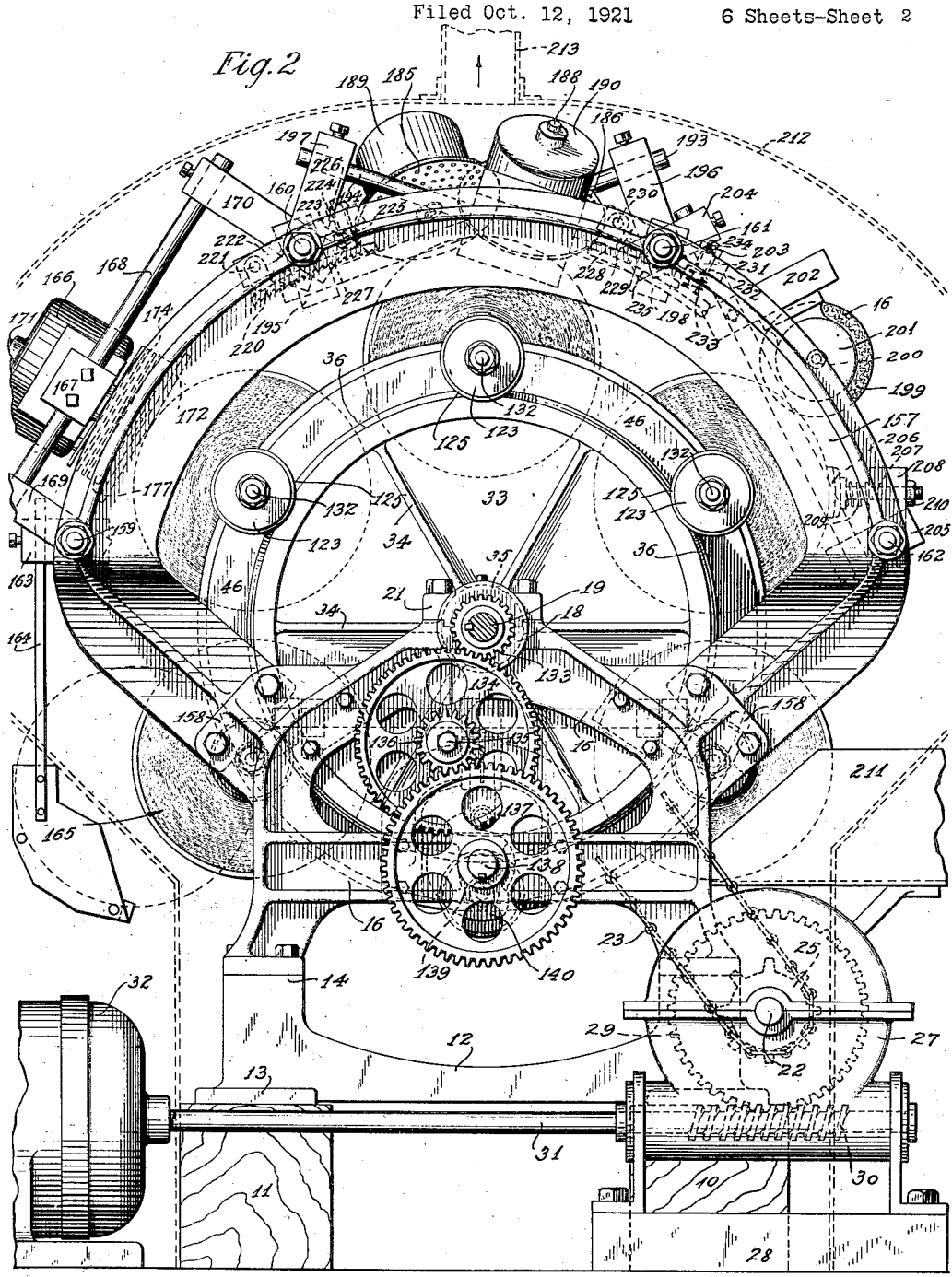

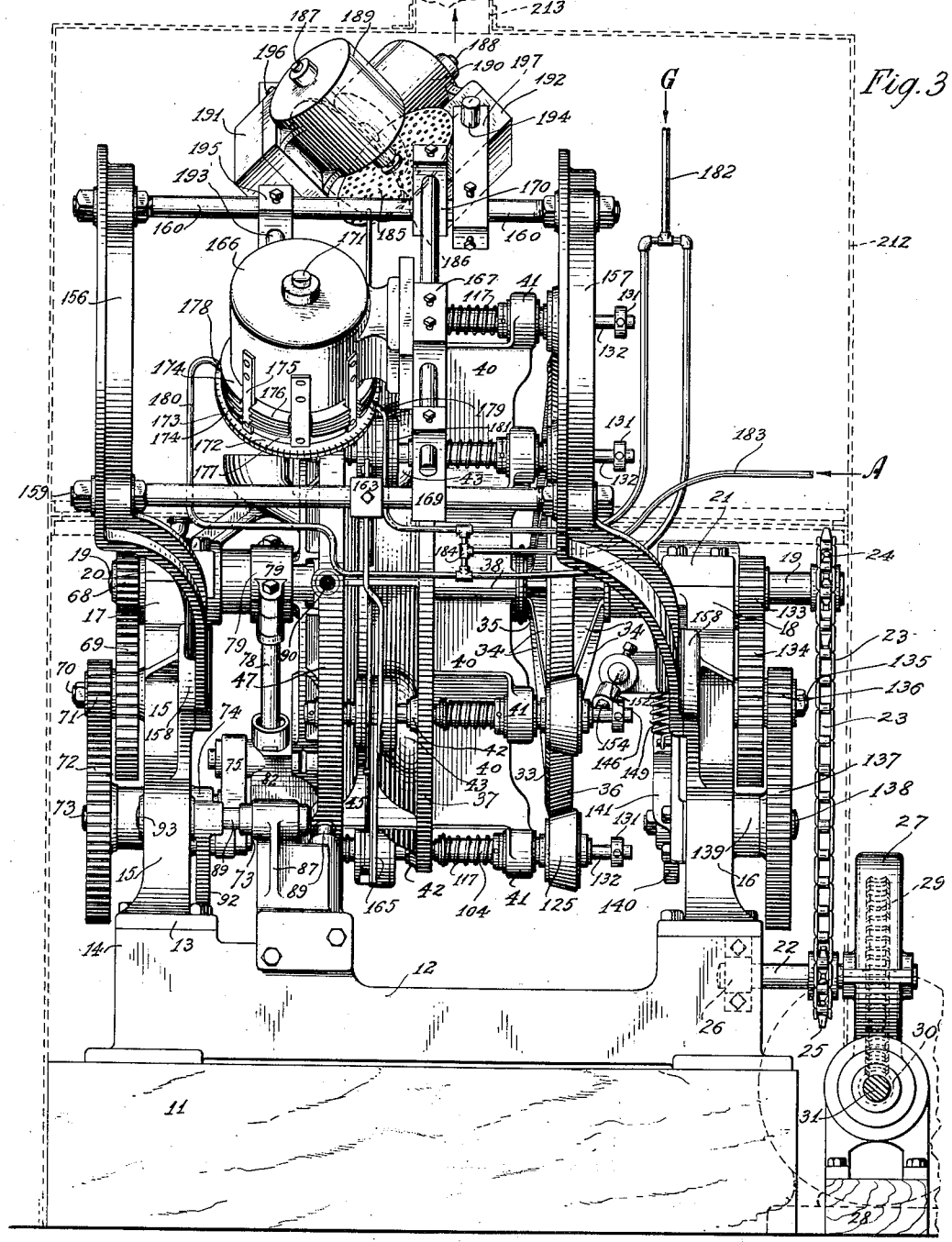

June 30, 1925.  1,544,083
F. S. WHITTEN
METHOD AND MEANS FOR SURFACING OR EDGING ARTICLES
Filed Oct. 12, 1921  6 Sheets-Sheet 4
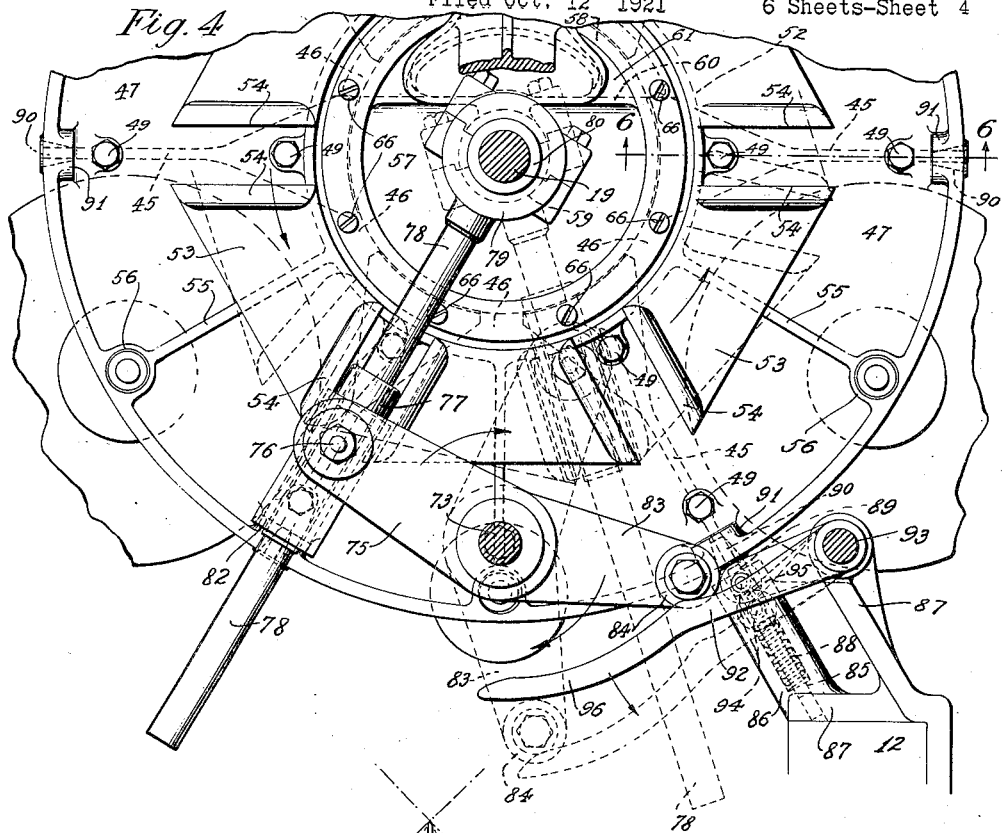
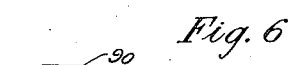
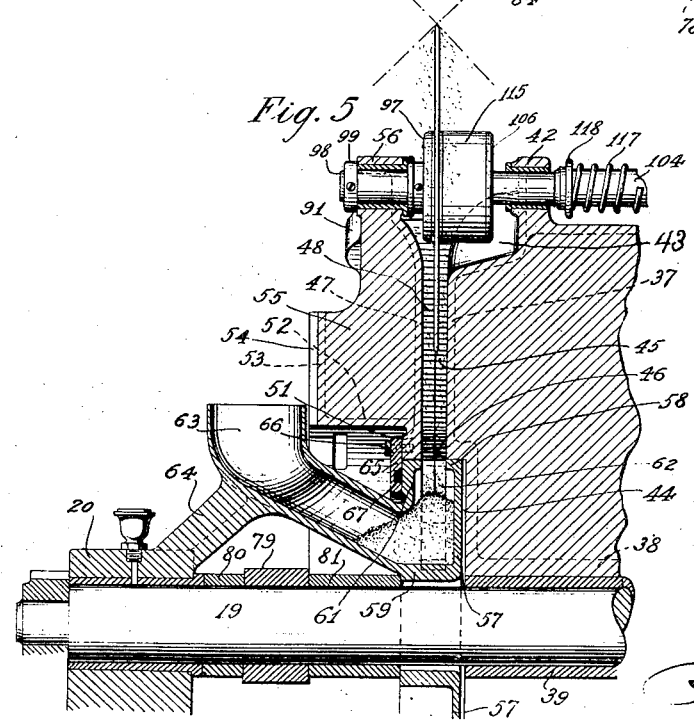
INVENTOR
*Francis S. Whitten*
BY
*Ray B. Whitman*
ATTORNEY

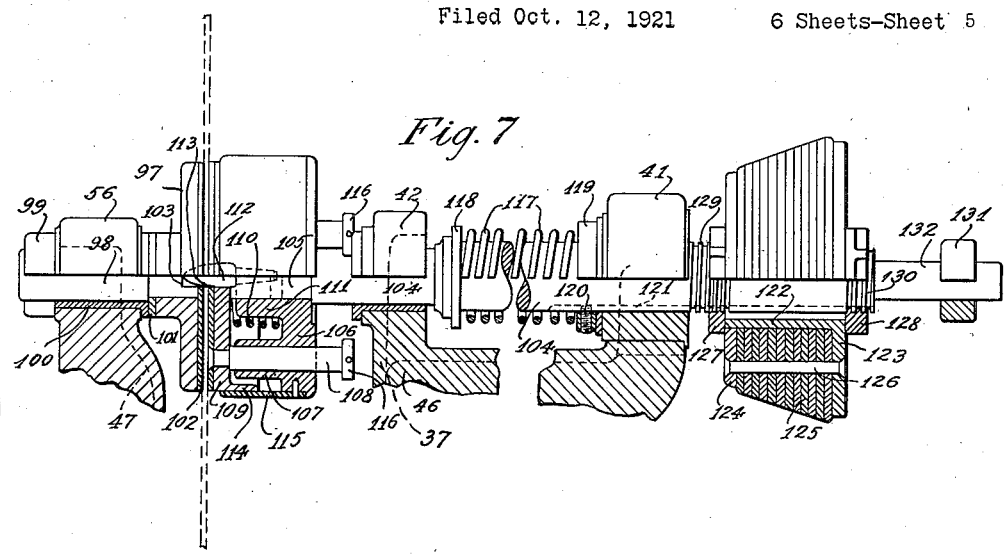

June 30, 1925.

F. S. WHITTEN 1,544,083

METHOD AND MEANS FOR SURFACING OR EDGING ARTICLES

Filed Oct. 12, 1921 6 Sheets-Sheet 6

INVENTOR
Francis S. Whitten
BY
Ray B. Whitman
ATTORNEY

Patented June 30, 1925.

1,544,083

UNITED STATES PATENT OFFICE.

FRANCIS S. WHITTEN, OF MIAMI, FLORIDA, ASSIGNOR, BY MESNE ASSIGNMENTS, TO COLUMBIA PHONOGRAPH COMPANY, INC., A CORPORATION OF NEW YORK.

METHODS AND MEANS FOR SURFACING OR EDGING ARTICLES.

Application filed October 12, 1921. Serial No. 507,314.

*To all whom it may concern:*

Be it known that I, FRANCIS S. WHITTEN, a citizen of the United States, and a resident of the city of Miami, county of Dade, and State of Florida, have invented certain new and useful Improvements in Methods and Means for Surfacing or Edging Articles, of which the following, taken in connection with the accompanying drawings, is a specification.

This invention relates to methods and means for surfacing or edging articles; and the present embodiment is particularly designed for use in the edging of articles of circular form, and especially phonograph disc-records.

In pressing such records, a fin is formed upon the edge, due to the squeezing of the excess material between the edge-confining flanges, or rims of the record dies. It has been the practice to remove the greater part of this fin by snapping it from the record, and thereafter manually removing the remaining rough edge by grinding off and smoothing with sand-paper. This method not only proved expensive and time-consuming, but was essentially unsatisfactory, because the varying efficiency of the operators resulted in non-uniformity of product. Moreover, a vast quantity of sand-paper was consumed, and this represented a very considerable item in the cost of record production.

An object of this invention is to provide for the economical and uniform surfacing or edging of certain articles, and particularly, though not necessarily, phonograph records. Broadly, the invention contemplates the relative contacting movement between an article to be edged and the edging means; the bodily movement of the article into and out of cooperative relation with such edging means; and either periodic stopping of the article during its transitory movement through the machine, or its progression therethrough, during the cooperation of the edging means. The edging means may be stationary or movable, and of any desirable form or material, depending upon the requirements of the article being worked upon. Thus, for instance, such means may have the effect of an abrasive, polisher, buffer, chiseler, or saw; or may be in the nature of a melting, molding, or fusing agency. In a single machine, it may be desirable to provide all of such means or agencies in succession, or various combinations of two or more of them, either arranged stationary or movable.

Another object is to provide an automatic apparatus into which said articles can be fed rapidly, in which they will be edged or polished, or both; and from which they will be finally ejected.

With these and other objects in view, embodiments of the invention are shown in the accompanying drawings, and these will be hereinafter more fully described with reference thereto, and the invention finally pointed out in claims.

In the drawings—

Fig. 2 is a rear elevation of the same.

Fig. 3 is its end elevation.

Fig. 4 is a detail view, with parts broken away, showing the intermittent feed mechanism of the record-carrier.

Fig. 5 is a vertical sectional view, taken along the line 5—5 of Fig. 1, showing the manner of grinding or cutting the edge, and indicating in dot-and-dash lines the position of the edge-grinding members.

Fig. 6 is a sectional view, taken along the line 6—6 of Fig. 4, showing the manner of connecting together the two portions of the record-carrier.

Fig. 7 is a view, partially in section and partially in elevation, of one of the record-holders, and its associated parts.

Fig. 8 is a perspective fragmentary view, showing the cam-actuated mechanism for closing and opening the record-holder to secure and release the records as they are respectively fed into the machine and removed after edging.

Similar reference characters indicate corresponding parts throughout the several figures of the drawings.

Figure 1:
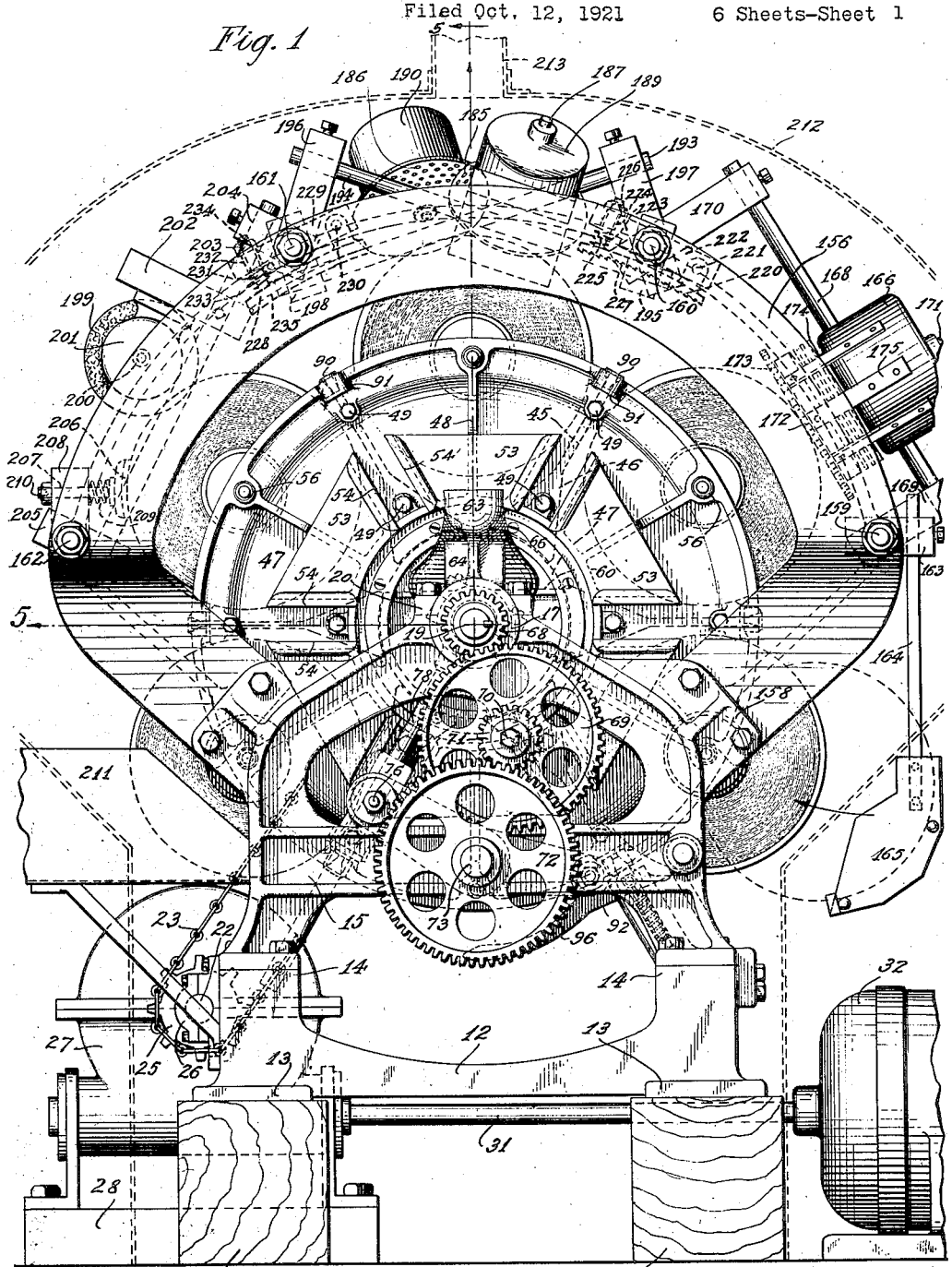
Fig. 1 is a front elevation of the particular machine herein disclosed, and comprising one form of the invention.

The machine is mounted upon two beam supports 10 and 11, (Figs. 1 and 2), and includes a rectangular frame base 12 having corner feet 13 secured to the beam supports. Mounted upon the upwardly projecting corner portions 14 of the base, there are provided two substantially A-shaped side frames 15 and 16 of similar form, and reversed relatively to each other. At the upper ends of the side frames, there are provided bearing seats 17 and 18, in which the main shaft 19 is journaled beneath bearing caps 20 and 21. The shaft 19 is adapted to be driven from a counter-shaft 22 by a sprocket chain 23 extending over sprocket gears 24 and 25 respectively provided on the shafts, (see Fig. 3); and the shaft 22 is journaled at its ends in a bearing 26 provided on the base 12, and in a worm gear casing 27 mounted upon a suitable base 28. A worm gear 29 (Fig. 2) is provided upon the shaft 22 within the casing, and meshes with, and is driven by a worm 30 provided on a motor-driven shaft 31 extending from a driving motor 32. A friction driving-wheel 33, having radial reinforcing ribs 34 formed upon its sides and which increase in width towards its hub 35, is mounted upon, and turns with, shaft 19. The driving-wheel 33 is adapted, as will hereinafter more fully appear, to continuously rotate the records carried by the rotating record-carrier, and for this purpose, is provided with a beveled peripheral rim 36, formed of rubber, fiber, or other suitable material.

The record-carrier is also mounted upon the shaft 19, but is loosely rotatable with respect thereto, and comprises a bowl-shaped plate 37 (Fig. 3) provided with an elongated hub 38 having a bushing 39 (Fig. 5) engaging the shaft, and having formed upon its rear side, a series of relatively-deep radial ribs 40 (Fig. 3) provided at their outer end portions with spaced bearings 41 and 42 (Figs. 3 and 7). Sockets 43 (Fig. 3) are formed upon the front side of the plate adjacent the bearing 42, for accommodating a portion of the record-holding chuck hereinafter more fully described, and an annular recessed portion 44 (Fig. 5) surrounds the shaft. Upon the inner face of the plate 37 (Fig. 6), there are formed a series of radial ribs 45 disposed medially of the ribs 40, and provided at their inner ends with diverging enlarged-portions, the sides of which extend toward each other to an outlet space 46 between them.

A complementary face plate 47 (Fig. 5) is mounted upon the plate 37, and is provided upon its inner surface with radial ribs 48 corresponding with and engaging the ribs 45, and secured thereto by bolts 49 (Fig. 6) passing through enlargements 50 formed upon the plates to accommodate them. The connected ribs, it will be seen, form the walls of pockets in which the records are adapted to rotate.

The plate 47 is provided with a relatively-narrow hub portion 51 (Fig. 5) having an inner diameter corresponding to that of the recess 44, and also a relatively-larger-diameter elongated hub portion 52, supporting at its forward end a series of plates 53 having their adjacent spaced edges parallel and flanged, as at 54, and forming an enlarged "Geneva" intermittent gear (Fig. 4). A series of radial reinforcing ribs 55, (Fig. 4) are formed upon the plate 47, extending from the rear sides of the plates 53, to bearing portions 56 formed upon the plate 47 in axial alignment with the bearing portions 41 and 42 of the plate 37 (Fig. 7). The plate 47 is bowled in opposed directions to plate 37, but not to as great an extent.

A dust receptacle for receiving the cut particles from the records is provided within the annular recess formed by the recess 44 (Fig. 5) of the plate 37 and the hub portion 51 of the plate 47, and comprises a disc portion 57 having a flanged rim portion 58 engaging the inner circumferential surface of the recess, and having a hub portion 59 surrounding and spaced from the shaft 19. The upper portion is enclosed by means of a horizontal shelf 60 (Fig. 4) and a front wall 61, the shelf extending laterally from the hub, while the front closure portion extends upwardly from the shelf to the flanged rim 58. The flanged rim is provided with a slot 62 (Fig. 5) extending from one end to the other of the shelf portion, and registering with the outlets 47 of the record-carrier, so that the particles cut from the records will fall into the dust receptacle. Access is had to the receptacle, for periodical removal of the dust, through a funnel extension projecting forwardly therefrom, and provided with a post 64 formed integral therewith, and with the bearing cap 20. A retaining ring 65 is secured to the hub portion 51 by screws 66, and projects over the outer marginal portion of the dust reservoir, being provided, at its inner surface, with an annular insert or gasket 67, of felt or other suitable friction-reducing substance.

The record-carrier, in the modification now being described, is adapted to be rotated intermittently, and to this end, the following mechanism is provided:

A pinion gear 68 (Figs. 1 and 3) is provided upon the end of the shaft 19 and meshes with a gear 69 journaled upon a stud shaft 70, and carrying a pinion gear 71 which meshes with a gear 72 provided upon a crank shaft 73 journaled in a bearing 74 (Fig. 3) of the frame 15. Upon its inner end, the crank shaft is provided with a crank arm 75 pivotally connected at its end by a wrist pin 76 (Fig. 4) to a slide block 77 mounted to reciprocate upon an oscillating rod 78 having its hub portion 79 rotatably mounted upon the shaft 19 between sleeves 80 and 81 (Fig. 5). The slide has a projecting block portion 82 (Fig. 4) adapted to engage the slots formed between the flanges 54 of the record-carrier as it is reciprocated to and fro through the rotation of the crank and the oscillation of the rod 78, thereby imparting an intermittent rotation to the record-carrier.

The crank shaft 73 is also provided with a crank arm 83 provided with a roller 84 at its outer end, adapted to intermittently release the record-carrier locking mechanism to permit of its intermittent rotation. This mechanism comprises a plunger rod 85 mounted in a cylindrical guide portion 86 provided upon a bracket 87 secured to the base frame 12, being normally forced outwardly by means of a spring 88 disposed within the portion 86. The outer end of the plunger rod is provided with a tapered head 89 adapted to engage one of a series of socket members 90 disposed in enlargements 91 of the record-carrier. A lever arm 92 is pivotally mounted, at 93, upon the bracket 87, and is engaged by a laterally-projecting pin 94 of the plunger, movable in a slot 95 of the cylindrical guide 86. The end of the lever 92 is curved, as at 96, and is adapted to be intermittently engaged by the roller 84 of the revolving crank arm 83, to withdraw the locking mechanism from engagement with the record-carrier so that its intermittent rotation may be permitted.

The record-holders, shown in detail in Fig. 7, each comprise a chuck-head 97 mounted upon a stud shaft 98 rotatably mounted in the bearing portions 56 of the plate 47. The shaft is held against longitudinal movement by a collar 99 secured to its projecting end. A flanged bushing 100 is provided within the bearing, and a washer 101 is disposed between the flange and the chuck-head 97. The front face of the chuck-head is faced with a layer of gripping material 102, and is provided centrally with a recess 103 adapted to receive a record-centering pin which will presently be more fully described.

Within the bearings 41 and 42 (Fig. 7), there is slidably and rotatably mounted a shaft 104 provided at its forwardly-projecting end with a reduced portion 105, upon which there is mounted a gripping and record-centering chuck-head. This chuck-head comprises a portion 106 fixed upon the reduced portion 105 and provided with out-standing enlargements 107 having passages therethrough, in which the guide rods 108 of a movable face plate 109 are slidable; a spring 110 disposed about the hub portion 111 urging the face plate toward the complementary chuck-head 97. A centering pin 112 is mounted upon the end of the shaft 104, being slidable in an opening 113 of the face plate 109, and its tapered projecting end being adapted to engage with the recess 103 of the head 97. A peripheral flange 114 is provided upon the face plate 109 and slidably engages within an annular skirt 115 provided upon the portion 106. Limiting collars 116, upon the ends of the rods 108, and adapted to cause the face plate to partake of the rearward reciprocating movement of the portion 106 as the collars come into contact with the rear side thereof through the expansive action of the spring 110 (Fig. 7), and after the centering pin has been withdrawn below the surface of the face plate. It will be seen that with this mechanism, the records to be removed from the carrier will be held by the chuck-head until the centering pin is entirely free therefrom, whereupon, the chuck-head will open to release the records. In placing the records into the carrier, the same will be first gripped, with light pressure, by the face plate, before the centering pin enters the center hole of the records. This will permit the tapered end of the centering pin, as it enters the record, to shift it slightly, if necessary, to center it; and gradually, at the same time, the chuck-head tightens to prevent relative shifting or turning. The shaft 104 is provided, at its intermediate portion—between the bearings 41 and 42—with a helical spring 117, engaging, at one end, a collar 118 fixed upon the shaft, and at its other end, a collar 119, having a set-screw 120 therein which slidably engages a longitudinal slot 121 in the shaft, so that the collar 119 is rotatable with the shaft but does not partake of its reciprocating movements.

Upon the outer projecting end of the shaft 104 (Fig. 8), there is mounted a beveled roller adapted to engage the beveled rim 36 of the wheel 33 as the shaft 104 is reciprocated inwardly, thereby causing it to be rapidly revolved. The roller comprises a central sleeve or hub portion 122 (Fig. 7) provided at its outer end with a relatively wide flange 123, and at its inner end with a relatively-narrow slidable ring 124, between which and the flange there is mounted a plurality of rings 125, which gradually increase in diameter toward the flange 123, and have their exposed outer surfaces forming one continuous bevel. These rings are formed of fiber, leather, or other suitable gripping material, and constitute a laminated roller. The layers are tightly held between the flange and ring by tie-rods 126. The roller is fixed against rotation upon the shaft, and at the same time, is adjustable longitudinally thereof, by means of nuts 127 and 128 engaging screw-threaded shoulders 129 and 130 of the shaft.

A collar 131 is provided upon the reduced end 132 of the shaft 104 and is adapted to be engaged by mechanism (now to be explained) to reciprote the shaft 104 rearwardly; the spring 117 reciprocating it forwardly. Upon the shaft 19 (Figs. 2 and 3), adjacent the bearing 21, there is mounted a pinion gear 133 meshing with a gear 134 provided upon a stud shaft 135 mounted in the frame 16, and which gear 134 carries a pinion gear 136 meshing with a gear 137 carried upon one end of a shaft 138 journaled in a bearing portion 139 of the frame 16. A cam 140 (Fig. 8) is mounted upon the other end of the shaft 138, and extending over this cam and supported upon the frame 16 is a yoke frame 141 having a central bearing 142 in which is mounted a vertically-reciprocating plunger 143 carrying a roller 144 at its lower end, which rides upon the cam. At its upper end, the plunger engages a rock-arm 145 provided centrally of a rock-shaft 146 journaled in bearing brackets 147 and 148 mounted upon the frame 16. A spring 149 secured at one end to a pin 150 provided on the arm 145, and at its other end to a pin 151 provided on the yoke frame 141, normally forces the rock-arm 145 downwardly, to retain the roller 144 in engagement with the cam 140.

At the projecting ends of the rock-shaft 146, there are provided fixtures 152 and 153 (Fig. 8) having projecting finger-portions 154 and 155, respectively, which engage behind the collars 131 on the shafts 104 as they come into the two positions indicated in Fig. 8. The rocking of the shaft, through the action of cam 140, moves the rock-arm 145 upwardly, and reciprocates the shafts 104 rearwardly, thereby opening the record-holding chucks. The parts are shown in this position by dotted lines. At one of these two positions, the machine is supplied with records to be edged, and at the other, the edged-records are discharged therefrom.

A pair of spaced tool-supporting yoke frames 156 and 157 (Fig. 3) are mounted upon projecting fin-plates 158 upon the frames 15 and 16, being circumferentially disposed with respect to the record-carrier, and having tool-supporting cross-rods 159, 160, 161 and 162 (Fig. 1) extending between them. The yoke frames are preferably of similar formation, and their upper portions are off-set to the left, as shown in Fig. 3, to provide ample room between them for the edging tools.

In operation, the drive-wheel 33 is continuously rotated, and through engagement of the beveled rollers in the record-carrier with the beveled periphery of said wheel 33, the record-carrying chucks are rapidly rotated. The record-carrier, in the embodiment now being described, is intermittently rotated so that the rapidly-rotating records are successively brought into operative relation with the several tools between the points at which they are fed into the machine, and removed therefrom.

As the record-holding chucks are moved into the feeding and discharge positions, they are opened through the action of the cam 140 and rock-shaft 146 (Fig. 8), permitting a record to be fed into one and removed from the other. As above pointed out, the action of the chuck is such that the centering pin is first withdrawn from the record to be removed, and thereupon, the jaw is opened to release the record, while in closing upon the inserted record, the chuck first lightly engages the record with sufficient gripping force to support it, and thereupon, the tapered centering-pin enters the center hole and centers it, the initial holding force of the chuck being insufficient to prevent this shifting of the record. Thereafter, the jaws are gradually tightened to a point such that the records will positively be rotated with the chuck.

Upon the cross-rod 159, (Figs. 1 and 2), there is rotatably mounted a bearing-block 163, from which depends a vertically-adjustable rod 164, provided at its lower end with a pocket 165 adapted to receive a segment of the record to be fed into the machine in such position that the center of the record will be substantially in an arc passing through the center of the chuck. The record, it will be understood, is placed manually into the pocket, and is then swung into position between the jaws of the open chuck. This, then, closes and automatically centers and grips the record, as above explained.

The intermittent rotation of the record-carrier moves this record to its position in relation to the first edging tool, the record being rapidly rotated from the time the chuck is closed and the roller 125 brought into engagement with the rim 36 of the drive-wheel 33. This first tool, in the embodiment now being described, is adapted to heat the edge of the record so as to soften it sufficiently to facilitate the action of the next tool. It comprises an electric motor 166 having a projecting bracket portion 167, mounted for longitudinal adjustment upon a rod 168 supported at its ends in blocks 169 and 170 mounted for transverse adjustment upon rods 159 and 160. The shaft 171 (Fig. 3) of the motor is provided at its inner end with the heating plate 172, which is adapted to be rapidly rotated by the motor, and with its marginal area contiguous to the edge of the record. This plate 172 is serrated through its edge, as at 173, and in the space between the plate and the motor, there is mounted a plurality of heat-radiating plates 174 supported by strips 175 secured to the motor casing. Each plate is provided with projecting portions 176 extending between and beyond the supporting strips. These plates serve as a heat insulator to prevent excessive heating of the motor from the heated plate. Immediately above the plate 172, there is provided a cylindrical heat chamber 177 mounted near the inner ends of the strips 175. In the opposite sides of this chamber, there are provided gas jets 178 and 179 so directed with relation to the walls of the chamber, that the heat from both jets will be directed down upon the plate 172. The gas jets are connected by pipes 180 and 181 to a gas supply pipe 182, the air under pressure being supplied to the pipes 180 and 181 by an air pipe 183 connected with said pipes by a distributing connection 184. As each record comes into relation within the heat zone of the rapidly-rotating heated plate 172, its edge is softened sufficiently to later permit the several edging tools to successively grind and finish the edges in the most efficient manner.

After the record is treated by the revolving heated plate 172, the carrier moves through one of its equal increments of rotation, and during its transition, the record cooperates with an edge-grinding shoe 220, mounted intermediate the stopping positions. The shoe is pivotally supported at one end, as at 221, upon a block 222 mounted for transverse adjustment upon the cross-bar 160. The other end of the shoe is yieldable under pressure and, for this purpose, there is attached a post 223 extending through a guide-passage 224 of the block 222, a spring 225 being disposed upon the post between the shoe and the block; and an adjustable holding-nut 226 at the end of the post limits the normal position of the shoe.

The face of the shoe is provided with rasp-like teeth 227, adapted to cooperate with the edge of the record, as it is moved beneath it, to remove the greater irregularities preparatory to engagement of the record with the next edging tool. The arcuate face of the shoe is founded upon the circumferential line through which the outermost point of the record passes, but is normally disposed in eccentric relation thereto with the pivoted end slightly beyond such line and the swinging end slightly within it. This mounting of the shoe enables the rough edges of the records, which constantly vary, to come gradually into relation with the shoe, and as they pass along it, the shoe is forced outwardly against the pressure of the spring, so that it exerts a yielding pressure on the record edge.

As the carrier comes to a stop, the record is brought into relation with the next edging tool. This consists of a pair of perforated steel discs 185 and 186 (Figs. 1, 2, and 3) mounted upon the shafts 187 and 188 of motors 189 and 190. The motors are provided with projecting side brackets 191 and 192, respectively, mounted for longitudinal adjustment upon diagonally-disposed rods 193 and 194 supported at their ends in blocks 195 and 196, and 197 and 198 mounted, respectively, upon the cross-bars 160 and 161, and adjustable transversely of the machine. The discs 185 and 186 are so arranged that they engage the edge of the record in inclined relation at each side, and with their surfaces tangential thereto. In order to permit the record to move into and out of relation to the discs by movement of the carrier, the discs are slightly flexible, so that as the record is moved into place, the disc 185 is flexed, or bent outwardly, and in moving out of place, the disc 186 is similarly flexed. The discs also engage the edge of the record with a slight pressure during the grinding action, and as they are rapidly rotated with respect to the rapidly rotating record, the broken surface formed by the perforations, cuts, grinds, or smoothes the edge so that it becomes of substantially V-shaped cross-section.

The carrier now moves through its next increment, and during such movement, the record moves in contacting relation with a shoe 228, supported upon the cross-bar 161 by means of a mounting block 229, to which the shoe is pivotally connected at one end, as at 230. The other end is yieldable under pressure by means of a post 231 thereon, extending through a guide passage 232 in the block, a spring 233 upon the post forcing the shoe inwardly, at the same time permitting outward movement under pressure, and an adjustable nut 234 at the end of the post limits the normal position of the shoe.

A groove 235 is formed in the face of the shoe and presents a slightly abrasive surface to the record edge, the action of which is relatively fine as compared to that of the edging-tools before described. The disposition of the shoe, with relation to the carrier, is the same as that of the shoe 220.

As the carrier comes to its next stopping position, it brings the record into relation with a tool adapted to polish and clean it. This consists of a rapidly rotating buffing wheel 199 of suitable soft material—as, for instance, felt, wool, or the like—mounted upon a shaft 200 of a motor 201 having its side bracket 202 mounted for longitudinal adjustment upon a rod 203 secured at its ends in blocks 204 and 205 mounted for longitudinal adjustment upon the rods 161 and 162. Thus, movement is possible to any desired position of the buffing wheel.

In this position, the record is also polished by means of a curved polishing shoe 206 mounted on the end of a plunger rod 207 slidable in a block 208 mounted for longitudinal adjustment upon the rod 162. A spring 209 is provided upon the plunger rod between the block 208 and the shoe, so that the shoe will engage the edge of the record with a slight yield, and at the same time, will enable the record to be moved into and out of position, without obstruction. A nut 210 at the outer end of the plunger limits its movement, and also permits of its adjustment inwardly as the surface of the shoe gradually becomes worn. The face of the shoe is preferably provided with a groove of V-shaped cross-section into which the edge of the record fits, and this face may be formed of graphite or other suitable finishing substance.

As the record is moved to the next position by the movement of the carrier, the holding chuck is opened through the action of the projecting finger portion 155 (Fig. 8), and the record automatically drops upon a chute 211, and its momentum carries it away from the machine.

The machine may be enclosed by means of a hood, as shown by the dotted lines 212, (Figs. 1, 2, and 3), an outlet pipe 213 being provided at the top through which dust may be conveyed by suction, and suitable openings being also provided in the hood for the feeding and the ejecting of the records. The hood is preferably removably mounted so that it may be swung out of position, to permit access to the operating parts of the machine.

Figure 9:
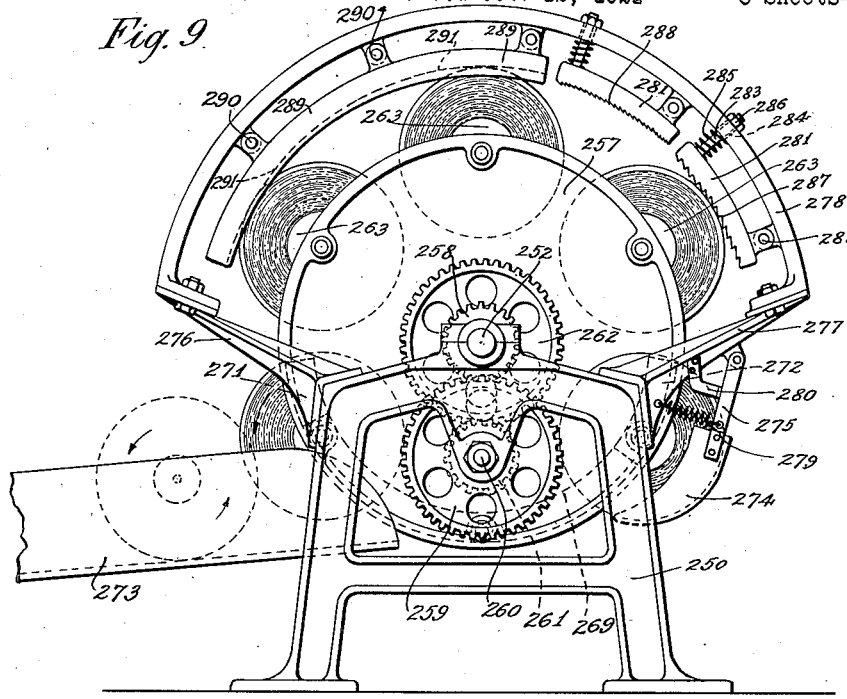
Fig. 9 is a front elevation of a modified form of the invention, in which the record-carrier is continuously rotated during the grinding.
Figure 10:
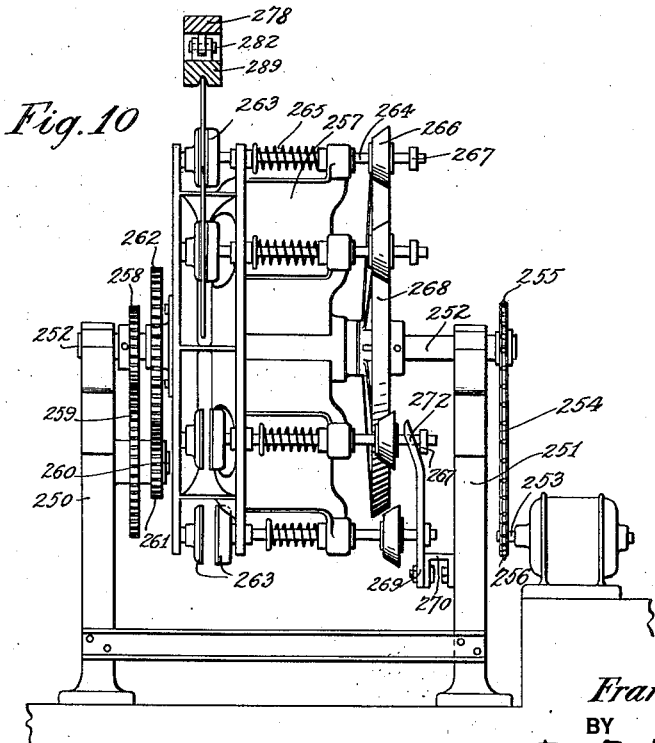
Fig. 10 is an end elevation thereof.

In Figs. 9 and 10, there is illustrated a modified form of the invention, in which the record-carrier is rotated continuously during the edging of the records. Upon two supports, 250 and 251, there is journaled a horizontal shaft 252, driven from the motor drive shaft 253 by a sprocket chain 254 extending over sprocket gears 255 and 256, respectively mounted on the shafts 252 and 253.

The record-carrier 257, which—with the exception of the driving mechanism—is essentially similar to the other form of the invention, is loosely mounted on the shaft 252, and is driven therefrom by reduction gearing, comprising a pinion 258 fixed to the shaft 252, a gear 259 mounted upon a stud shaft 260, and a pinion 261 rotatable with the gear 259, and which, in turn, meshes with gear 262 secured to the carrier.

Clutches 263 (Fig. 10), for holding the records, are disposed in radially-spaced relation in the record-carrier, and are mounted upon rotatable and longitudinally-shiftable shafts 264, these shafts being provided with a spring 265, a beveled roller 266, and a collar 267. This construction is essentially similar to the embodiment previously described.

A beveled driving wheel 268 is fixed to the shaft 252, and engages the individual beveled driving wheels of the clutches, thereby imparting rapid rotation to the records held in the clutches.

A circumferential cam 269 is supported upon the frame 251 by a bracket 270, and is provided at its ends with inclined rises 271 and 272 (Fig. 9), which are adapted to open and close, respectively, the clutches by engagement of the collars 267 with said rises. The rise 271 opens the clutch so that the edged record will drop to a chute 273, and be propelled downwardly through its own rotation. The rise 272 is so designed that the clutch will first close upon the record (which has been previously inserted in the machine) sufficiently to pick it up and convey it. The center pin of the clutch thereupon projects into the center hole of the record, and upon leaving the cam, the clutch is tightly closed, and through engagement of the beveled roller 267 with the beveled drive-wheel 268, the clutch is rapidly rotated.

The record is placed in proper position in the machine by any suitable means. Thus, for instance, there can be provided a swinging holder 274, mounted upon a pivoted arm 275, supported upon the bracket 277 which, with bracket 276, mounts the circumferential tool support 278, more fully referred to below. A spring 279 tends to move the holder inwardly, and a stop 280 limits such movement, so that the record will be accurately centered with relation to the clutch as same closes upon it.

Varying kinds of edging means may be employed. In the form here illustrated, it comprises a series of substantially circumferentially-disposed shoes mounted upon the tool support 278, the first two shoes being yieldably mounted while the third shoe is stationary and relatively longer than the others.

The yieldably mounted shoes 281 are pivotally mounted at one end, as at 282, and yieldably mounted at the other, being provided with a post 283 slidably engaging a passage 284 in the support, and having a spring 285 disposed thereon, and between the shoe and the support. An adjustable nut 286, at the end of the post, limits the normal position of the shoe.

The individual surfaces of the shoes are slightly eccentric to the circumferential path of the record edge in its movement with the record-carrier. Thus, the end of the shoe, first engaged by the record, is slightly outside the circumferential line of movement of the outermost point of the record; and the other yieldable end is slightly within such line. This permits the shoe to gradually engage records of varying degrees of roughness with a yielding pressure, at the same time allowing the record to pass without impedance.

The surfaces of the shoes are of gradually-increasing fineness, and may be grooved or otherwise suitably formed. In the disclosed embodiment, the shoes 281 are provided with rasp-like surfaces 287 and 288 of comparative but varying coarseness.

The elongated shoe 289 is stationary, being supported upon a plurality of brackets 290. Its surface is eccentric to the circumferential path of the record, so that it grinds with continued effect as the record is conveyed. The surface is preferably grooved, as at 291, the groove being abrasive and of gradually-increasing fineness. The end portion of the groove may be in the nature of a finishing or burnishing surface.

In the embodiments illustrated, it is seen that the invention provides means by which circular articles, and particularly phonograph disc-records, may be edged or finished efficiently, automatically, and in a minimum of time, and also that such means edges the records economically, and altogether in an infinitely more satisfactory manner than has been possible by the methods heretofore in use. The disclosure shows two specific forms of the invention, in one of which the rotating records are intermittently progressed through the machine, and in which there is a combination of edging means which cooperate with the records, during the intermittent transition of the records, and also during the stationary periods between said movements. In the other form, the records are continuously moved through the machine. It will be understood, therefore, that the particular forms and the different parts here illustrated and described are merely typical embodiments of the invention by way of illustration, and not by way of limiting or narrowing the claims; as obviously, a great many changes in construction and design can be made without departing from the invention and without affecting the different sub-combinations thereof, and obviously also, various of the features described can be omitted, leaving the machine still operative to usefully do certain of the work described. Such changes are contemplated by the invention and would not involve any departure therefrom, as defined in the claims.

Having now described the invention, what is claimed as new and for which Letters Patent of the United States is desired, is:

1. In a surfacing machine, a rotatable conveyor for records or the like adapted to support a plurality of records in spaced relation, record holding means having cushioning surfaces for frictionally engaging and supporting the records, means for intermittently rotating the conveyor to bring the records successively into predetermined positions, and means adapted to engage the edges of the records in such positions to surface them.

2. In a surfacing machine, a rotatable conveyor for records or the like adapted to support a plurality of records in spaced relation, cushioning means on the conveyor for frictionally engaging and supporting the records, means for intermittently rotating the conveyor to bring the records successively into predetermined positions, means adapted to continuously rotate the records relatively to the conveyor, and means adapted to engage the edges of the records in such positions to surface them.

3. In a surfacing machine, a rotatable conveyor for records or the like, a driving member rotatable about the axis of the conveyor, and adapted to be rotated continuously, a plurality of record-supporting means rotatably mounted in the conveyor in spaced relation, said record-supporting means having cushion surfaces adapted to frictionally engage substantial areas of the opposite sides of a record, and adapted to be rotated by the driving member, means adapted to rotate the conveyor intermittently upon the shaft, and in increments equal to the spacing of the record-supporting means, and means adapted to engage the edges of the records to surface them.

4. In a surfacing machine, a rotatable conveyor for records or the like, a driving member rotatable about the axis of the conveyor, and adapted to be rotated continuously, a plurality of record-supporting means rotatably mounted in the conveyor in spaced relation, and each comprising a chuck-head adapted to engage the record at one side, a chuck-head adapted to engage the record the other side, one of the chuck-heads being mounted for rotative movement and movement away from the other head to release a record therebetween, and means rotatable with the chuck-head engaging the driving member to be driven thereby, means adapted to disengage the last-named means from the driven member to stop rotation of the chuck, said last-named means adapted, upon disengagement from the driving member, to move the chuck-head longitudinally to open the chuck, the records adapted to be inserted and discharged in such position of the chuck, and means adapted to engage the edges of the records to surface them.

5. In a surfacing machine, a rotatable conveyor for records or the like, a driving member rotatable about the axis of the conveyor, and adapted to be rotated continuously, a plurality of record-supporting means rotatably mounted in the conveyor in spaced relation, and each comprising a chuck-head adapted to engage the record at one side, a chuck-head adapted to engage the record at the other side, one of the chuck-heads being mounted for rotative movement and movement longitudinally of its axis, and means rotatable with the chuck-head engaging the driving member to be driven thereby, means adapted to disengage the last-named means from the driving member to stop rotation of the chuck, said last-named means adapted, upon disengagement from the driving member, to move the chuck-head longitudinally to open the chuck, the records adapted to be inserted and discharged in such opened position, and means adapted to engage the edges of the records to surface them.

6. In a surfacing machine, a rotatable conveyor for records or the like, a driving member rotatable about the axis of the conveyor, and adapted to be rotated continuously, a plurality of record-supporting means rotatably mounted in the conveyor in spaced relation, and each comprising a chuck-head adapted to engage the record at one side, a chuck-head adapted to engage the record at the other side, one of the chuck-heads being mounted for rotative movement and movement longitudinally of its axis, a centering pin adapted to center the record, means rotatable with the chuck-head engaging the driving member to be driven thereby, means adapted to disengage the last-named means from the driving member to stop rotation of the chuck, said last-named means adapted, upon disengagement from the driving member, to move the chuck-head longitudinally to open the chuck, the records adapted to be inserted and discharged in such opened position, means adapted to impart longitudinal movement to the centering pin relatively to the chuck-head, whereby the centering pin is withdrawn from the records before longitudinal opening movement of the chuck-head, and means adapted to engage the edges of the records to surface them.

7. In a surfacing machine, a rotatable conveyor for records or the like, a driving member rotatable about the axis of the conveyor and adapted to be rotated continuously, a plurality of record-supporting means rotatably mounted in the conveyor in spaced relation, and each comprising a chuck-head adapted to engage the record at one side, a chuck-head adapted to engage the record at the other side, a shaft supporting the chuck-head and mounted for rotative and longitudinal movement, the shaft adapted to have a limited relative longitudinal movement with respect to the head, a centering pin movable with the shaft and adapted to center the record, a driving connection between the driving member and the shaft adapted to be disconnected upon longitudinal movement of the shaft, means adapted to periodically impart longitudinal movement to the shaft, and means adapted to engage the edges of the records to surface them.

8. In a surfacing machine, a rotatable conveyor for records or the like, a driving member rotatable about the axis of the conveyor and adapted to be rotated continuously, a plurality of record-supporting means rotatably mounted in the conveyor in spaced relation, friction rollers adapted to rotate the record-supporting means and having frictional engagement with the driving member to be driven thereby, and means adapted to engage the edges of the records to surface them.

9. In a surfacing machine, a rotatable conveyor for records or the like, a driving member rotatable about the axis of the conveyor and adapted to be rotated continuously, an annular beveled rim on the driving member, a plurality of record-supporting means rotatably mounted in the conveyor, beveled friction rollers adapted to rotate the record-supporting means and having frictional engagement with the beveled rim of the driving member to be driven thereby, and means adapted to engage the edges of the records to surface them.

10. In a surfacing machine, a rotatable conveyor for records or the like provided with a plurality of radial pockets, record-supporting means rotatably mounted in the pockets, means for rotating the record-supporting means, and means adapted to engage the edges of the records to surface them.

11. In a surfacing machine, a rotatable conveyor for records or the like provided with a plurality of radial pockets having their peripheral ends open and provided at their inner ends with outlets, a receptacle having an opening registering with the openings of the pockets and adapted to receive particles removed from the records, record-supporting means rotatably mounted in the pockets, means for rotating the record-supporting means, and means adapted to engage the edges of the records to surface them.

12. In a surfacing machine, a rotatable conveyor for records or the like provided with a plurality of radial pockets having their peripheral ends open and provided at their inner ends with relatively small outlets, a receptacle having a relatively long opening registering with a plurality of the outlets of the pockets and adapted to receive particles removed from the records, record-supporting means rotatably mounted in the pockets, means for rotating the record-supporting means, and means adapted to engage the edges of the records to surface them.

13. In a surfacing machine, a movable article conveyor, means adapted to rotate the article in said conveyor, and a rotatable heating plate disposed in relation to the carrier adapted to cooperate with the article.

14. In a surfacing machine, a movable article conveyor, means adapted to rotate the article in said conveyor, and rotatable abrasive discs engaging the edge of the article in inclined relation at each side thereof.

15. In a surfacing machine, a movable conveyor for records or the like, means adapted to rotate a record in said conveyor, and a yieldable surfacing disc engaging the edge of the record and having its surface tangential to the record edge.

16. In a surfacing machine, a movable conveyor for records or the like, means adapted to rotate a record in the conveyor, and a pair of yieldable surfacing discs having their surfaces tangential to the record edge and engaging the record edge at each side of a radial line common to the conveyor and the record.

17. In a surfacing machine, a movable conveyor for records or the like, means adapted to rotate a record in said conveyor, and a pair of rotatable surfacing discs engaging the edge of the record in inclined relation at each side and having their surfaces tangential to the record edge.

18. In a surfacing machine, a movable conveyor for a disk-shaped article, means adapted to rotate the article in said conveyor, and non-rotatable surfacing means disposed in relation to the conveyor and adapted to cooperate with the article, the surfacing means being pivoted at one end and yieldably mounted at its other end.

19. In a surfacing machine, a movable conveyor, means on the conveyor for rotating a disk-like article, and yieldable surfacing means disposed in relation to the conveyor and adapted to cooperate with the article, the surfacing means being pivoted at one end.

20. In a surfacing machine, a movable article conveyor, means adapted to rotate the article in the conveyor, and electric-motor-driven surfacing means disposed in relation to the conveyor and adapted to cooperate with the article.

21. In a surfacing machine, a movable article conveyor, means adapted to rotate the article in the conveyor, and surfacing means disposed in relation to the conveyor and adapted to cooperate with the article, and being mounted for adjustment in planes parallel and at right angles to the plane of rotation of the article.

22. In a surfacing machine, a rotatable conveyor for records or the like adapted to support a plurality of records in spaced relation, means for intermittently rotating the conveyor to bring the records successively into predetermined positions, means adapted to engage the records to surface them, and means for inserting records, comprising a swinging holder adapted to receive the record and to swing it into relation with the record-supporting means, the center of the record moving in an arc passing through the axis of the supporting means.

23. In a surfacing machine, a rotatable conveyor for records or the like adapted to support a plurality of records in spaced relation, means for intermittently rotating the conveyor to bring the records successively into predetermined positions, means adapted to engage the records to surface them, means adapted to release the records from the conveyor at a predetermined position after they are surfaced, and means for conveying the records away from the machine and comprising a chute adapted to receive them as they are released from the conveyor.

24. In combination, work-holding means, surfacing means, and means for automatically bringing the work and surfacing means into continuous contact for a predetermined period, and means mounting the surfacing means to have it engage the work at varying pressure.

25. In combination, work-holding means, stationary surfacing means having a cutting surface, means for automatically bringing the work and surfacing means into continuous contact for a predetermined period, and said surfacing means being pivoted at one end and resiliently mounted at its other end.

26. In combination, work-holding means, revolvable surfacing means having a heating surface, and means for automatically bringing the work and surfacing means into continuous relation for a predetermined period.

27. In combination, work-holding means, a plurality of revolvable surfacing means having finishing surfaces, stationary surfacing means interposed between said revolvable means, and means for automatically bringing the work and the respective surfacing means into continuous contact for predetermined periods.

28. In a machine of the character described, a rotatable article-conveyor, and heating means for treating a surface of the article to prepare the same for treatment by a yieldable surfacing means, the conveyor being adapted to move the article into and out of relation therewith.

29. In a machine of the character described, a work-holder having its work-engaging surfaces covered with a layer of gripping material, means for treating a surface of the work, and means for causing a relative bodily movement between the work-holder and said first means.

30. In a machine of the character described, a rotatable work-holder having its work-engaging surfaces covered with work gripping material, means for treating a surface of the work, and means for causing a relative bodily movement between the work-holder and said first means.

31. In a surface-treating machine, a movable work-holder, and surfacing means cooperating therewith and comprising a surface-treating member pivoted at one end and yieldable at its other end, the yieldable end projecting in the path of the work, the workholder adapted to move the work in contact therewith from the pivoted to the yielding end, whereby the member engages the work with pressure, as it is moved from the pivoted to the yielding end.

32. The method of surfacing phonograph records, which consists in rapidly rotating the article, and intermittently moving it in relation to a succession of surfacing means having different characteristics.

33. The method of surfacing phonograph records, which consists in providing a carrier for records, intermittently rotating the carrier through equal increments, feeding the record to the carrier at one stopping point, treating a surface of the record at a successive stopping point, and discharging the record at a further stopping point.

34. The method of surfacing and finishing the edge of a phonograph record, which consists in feeding it onto a revolvable spindle mounted on a revolvable conveyor, and conveying it while revolving successively into relation with a plurality of edge-surfacing and finishing means having different characteristics.

35. The method of surfacing the edge of a phonograph record, which consists in feeding it onto a revolvable spindle mounted on a revolvable conveyor, and conveying it while revolving in relation to edge-surfacing means, and finally ejecting the revolving record.

36. The method of surfacing the edges of phonograph records formed of thermoplastic material, which consists in bodily moving the record, heating its edge after an initial movement, removing surplus material and shaping the heated edge, and finally finishing the shaped edge.

37. A device for surfacing the edges of phonograph records formed of thermoplastic material, including means for supporting records for traveling movement, means for heating the edge of the record at an initial stage of such travel, means for removing surplus material from the heated edge, means for shaping the edge after the removal of such material, and means for finally finishing the shaped edge.

38. A device for surfacing the edges of phonograph records, including means for supporting a plurality of them for simultaneous traveling movement, and a plurality of progressively acting rubbing-means located at spaced points in the travel of the records to simultaneously engage their edge-surface.

39. In a surfacing machine, a rotatable work-conveyor provided with a plurality of radial pockets, work-supporting means rotatably mounted in the pockets, means for rotating the work-supporting means, and means adapted to engage the edges of the work to surface the same.

40. In a surfacing machine, a rotatable work-conveyor provided with a plurality of radial pockets having their peripheral ends open and provided at their inner ends with outlets, a receptacle having an opening registering with the openings of the pockets and adapted to receive particles removed from the work, work-supporting means rotatably mounted in the pockets, means for rotating the work-supporting means, and means adapted to engage the edges of the work to surface the same.

41. In a surfacing machine, a rotatable work-conveyor provided with a plurality of radial pockets having their peripheral ends open and provided at their inner ends with relatively small outlets, a receptacle having a relatively long opening registering with a plurality of the outlets of the pockets and adapted to receive particles removed from the work, work-supporting means rotatably mounted in the pockets, means for rotating the work-supporting means, and means adapted to engage the edges of the work to surface the same.

42. In a surfacing machine, a rotatable conveyor for records or the like, a driving member rotatable about the axis of the conveyor and adapted to be rotated continuously, a plurality of record-supporting means rotatably mounted in the conveyor in spaced relation, friction rollers adapted to rotate the record-supporting means and having frictional engagement with the driving member to be driven thereby, means for moving the rollers out of such frictional engagement, and means adapted to engage the edges of the records to surface them.

43. In a surfacing machine, a rotatable conveyor adapted to support a plurality of disc-shaped articles in spaced relation, means for intermittently rotating the conveyor to bring the articles successively into predetermined positions, means adapted to engage the articles to surface them, and means for inserting articles, comprising a swinging holder adapted to receive the disc-shaped article and to swing it into relation with the supporting means, the center of the article moving in an arc passing through the axis of the supporting means.

44. In a surfacing machine, a rotatable conveyor adapted to support a plurality of disc-shaped articles in spaced relation, means for intermittently rotating the conveyor to bring the articles successively into predetermined positions, means adapted to engage the articles to surface them, means adapted to release the articles from the conveyor at a predetermined position after they are surfaced, and means for conveying the articles away from the machine and comprising a chute adapted to receive them and support them upon their edges as they are released from the conveyor.

45. A record-supporting chuck including a pair of chuck-heads, one of which is provided with a yieldingly mounted face-plate to engage a side of a record, a centering pin adapted to center a record in the chuck, said pin associated with the chuck-head having the face-plate and movable longitudinally of its axis therewith, and said face-plate adapted to remain in contact with the record until the pin is removed therefrom.

Signed at 1819 Broadway, New York city, in the county of New York and State of New York, this 3rd day of October A. D. 1921.

FRANCIS S. WHITTEN.